Feb. 11, 1969     H. SCHUMACHER     3,426,628

CONTROL MECHANISM FOR A LATHE

Filed July 20, 1966

INVENTOR

Hermann Schumacher

BY B. Eshlinger

ATTORNEY

United States Patent Office 3,426,628
Patented Feb. 11, 1969

3,426,628
CONTROL MECHANISM FOR A LATHE
Hermann Schumacher, Faurndau, Germany, assignor to Gebr. Boehringer G.m.b.H., Goppingen, Wurttemberg, Germany, a limited-liability company of Germany
Filed July 20, 1966, Ser. No. 566,563
Claims priority, application Germany, July 23, 1965, B 82,978
U.S. Cl. 82—22
Int. Cl. B23b *21/00;* G05g *9/00, 13/00*
3 Claims

ABSTRACT OF THE DISCLOSURE

A pair of hand levers is carried by the bed slide of a lathe. One of these levers is mounted for universal motion. The levers are so connected with the feed control means of the lathe that forward and rearward rocking motion of the second lever causes forward and rearward feed of a cross-slide of the lathe, and rocking motion of the lever to the left or the right causes a corresponding feed motion of the bed slide. The first lever mounted in front of the second lever may be rocked to the right or to the left and, in response to such actuations, engages or disengages a clutch driving the feed spindles of the bed slide and of the cross-slide and engages or disengages the lead spindle of the lathe with the nut associated therewith.

---

Figure 1:
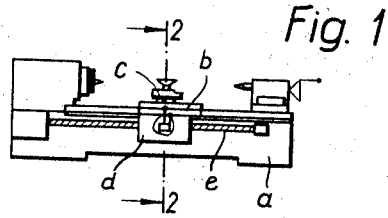

The present invention relates to a control mechanism for a lathe of the type having a bed slide, a cross slide carried thereby, a transmission box fixed to the bed slide, first means in the transmission box for advancing and returning the bed slide on the bed, second means in the transmission box for advancing and returning the cross slide on the bed slide, a lead spindle mounted on the bed, a nut carried by the transmission box and a device therein for engaging said nut with and disengaging it from the lead spindle and a safety clutch in said means. The transmission box is provided with hand levers for controlling the advancing and returning means of both slides, the nut-engaging and disengaging device and the safety clutch.

It is the object of the present invention to reduce the number of such levers to a minimum and to so mount at least one of said levers that the direction of its manual setting movement indicates the direction of the advancing or returning motion of the slide or slides controlled thereby and, consequently, facilitates the control of the lathe.

Further objects will appear from a detailed description of a preferred embodiment of the present invention which is illustrated in the accompanying drawings. It is to be understood, however, that the present invention is in no way limited to such details but is capable of numerous modifications within the scope of the appended claims and that the terms and phrases used in such detailed description have been chosen for the purpose of explaining rather than that of restricting or limiting the invention.

Figure 2:
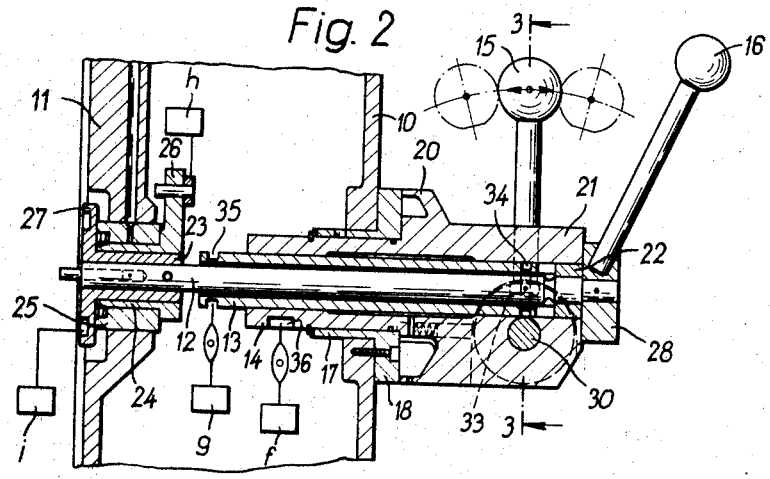
Figure 3:
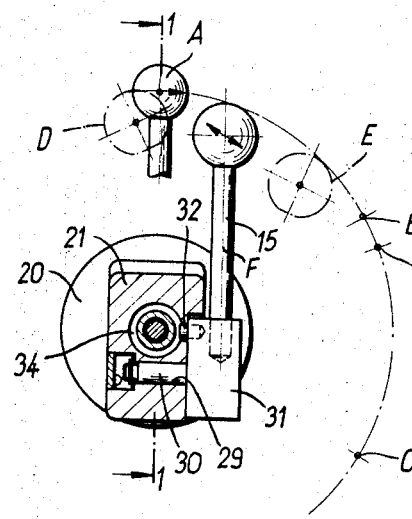

In the drawings:

FIG. 1 is a front view of a lathe of the type to which the present invention is applicable, FIG. 2 is an enlarged partial sectional view, the section being taken along the vertical plane II—II indicated in FIG. 1, FIG. 3 shows the central part of FIG. 1 on an enlarged scale, partly in section along the plane III—III indicated in FIG. 2.

The lathe shown in FIG. 1 is provided with a bed *a*, with a bed slide *b*, with a cross slide *c* carried thereby, with a transmission box *d* fixed to the bed slide *b*, and with a lead spindle *e* mounted on the bed.

The transmission box *d* includes first means, such as a reversing gearing diagrammatically indicated in FIG. 2 at *f*, for selectively advancing, stopping and returning the bed slide *b* on the bed *a*, second means, such as a reversing gearing diagrammatically indicated at *g* in FIG. 2 for selectively advancing, stopping and returning the cross slide *c* on the bed slide *b*, a device, such as *h*, FIG. 2, for engaging a nut with and disengaging it from the lead spindle *e* and a safety clutch *i* inserted between a drive shaft (not shown) and said reversing gears.

This safety clutch is manually engageable and disengageable.

The shaft just referred to extends parallel to the lead spindle *e* being likewise mounted on the bed *a* and meshes with a pinion journaled in the transmission box *d* and geared to the reversing gearings. Both slides *b* and *c* can be moved in either direction individually or simultaneously, as desired. Depending on the control of said reversing gears, the shaft just referred to effects the advance or the return of the bed slide *d* or the advance or the return of the cross slide *c* or both motions simultaneously. Should the motion of either slide be obstructed, the safety clutch will be automatically disengaged. This clutch can be arbitrarily engaged and disengaged by a cam 27 and controlled by a hand lever. The nut referred to hereinabove is disengaged from the lead spindle *e* during ordinary operations. It is engaged by a hand lever for the purpose only of cutting threads. When that happens, the safety clutch is manually disengaged.

Hence, it appears that the mechanism constructed in accordance with the present invention must provide for manipulations causing the following operations to be performed:

(1) Forward feed of the bed slide *b*,
(2) Return motion of the bed slide *b*,
(3) Forward feed of the cross slide *c*,
(4) Return movement of the cross slide *c*,
(5) Stoppage of the bed slide *b* and/or the cross slide *c*,
(6) Engaging the safety clutch,
(7) Disengaging the safety clutch,
(8) Engaging the lead spindle nut after disengagement of the safety clutch.

The necessity may arise of effecting each of the operations (1) and (2) simultaneously with each of the operations (3), (4) and (5). The operation (6) occurs when the safety clutch has been automatically disengaged in response to an excessive load acting on the reversing gearings. The operations (7) and (8) are effected for cutting threads.

All of these operations can be controlled by the mechanism described hereinafter.

The transmission box *d* fixed to the bed slide *b* has a front wall 10 and a rear wall 11. A horizontal shaft 12 is rotatably mounted in the transmission box *d* so as to extend transversely to the bed guide-ways and to the lead spindle *e* through the front wall 10. A second shaft 13 which is hollow is mounted on the first shaft 12 for longitudinal displacement thereon. A third shaft 14 which is likewise hollow is mounted on the second shaft 13 for rotation.

The first shaft 12 serves to control the operations (6), (7) and (8). The second shaft 13 serves to control the operations (3), (4) and (5). The third shaft 14 serves to control the operations (1), (2) and (5).

The operations of the three coaxially disposed shafts 12, 13 and 14 is effected by a pair of hand levers. The first hand lever 16 is fixed to the projecting end of the first shaft 12 for rotation thereof, whereas the second lever 15 is cooperatively connected with the shafts 13 and 14 to effect longitudinal displacement of shaft 13 and/or rotation of shaft 14.

The shaft 14 is journaled in a bushing 17 which is inserted in a bore of the front wall 10 of the transmission box and has a flange 18 which is fixed to the front wall 10 by a plurality of circumferentially distributed screws. The shaft 14 is provided with a flange 20 abutting the flange 18 and formed integral with a block 21 having a rectangular cross-sectional profile as will appear from FIG. 3. The axial bore of shaft 14 extends through the block 21 and the latter extends beyond the hollow shaft 13 and surrounds a bushing 22 inserted in the bore of block 21. This bushing forms a bearing for the outer end of the inner shaft 12. The inner end of shaft 12 carries a pair of sleeves 23 and 24 mounted in nested relationship and fixed to the shaft 12 by a transverse pin. The sleeve 24 is journaled in a bushing 25 inserted in a bore of the rear wall 11 of the transmission box and projects inwardly out of the bushing 25 and carries an arm 26, whereas the sleeve 23 extends outwardly beyond the sleeve 24 and carries a cam 27 provided with a cam groove for engaging and disengaging the safety clutch *i*. The arm 26 is pivotally connected with a member for operating the device *h* for engaging and disengaging the nut with the lead spindle.

As the reversing gearings *g* and *f*, the safety clutch *i* and the device *h* are well known in the art, it is believed that the diagrammatic illustration in FIG. 2 will suffice for a complete disclosure of the present invention.

In a first angular position of shaft 12 the safety clutch is engaged and the nut is disengaged from the lead spindle *e*. In a second angular position both the safety clutch and the nut are in disengaged condition. In a third angular position the safety clutch is disengaged but the nut is engaged with the lead spindle.

On the right-hand end of shaft 12 projecting out of block 21 an annular member 28 is mounted and is fixed to the shaft 12 by a transverse pin. This annular member 28 has a transverse and slightly inclined bore for insertion and attachment therein of the lower end of the hand lever 16 provided at its end with a spherical knob. The center of this knob assumes the position A or B or C respectively to bring the shaft 12 into the afore-explained first, second or third angular position. This means that the operator may bring the lever 16 into the position A for starting the movement of bed slide *b* or cross slide *c* or both which movement had been previously selected by the lever 15 described hereinafter. By bringing lever 16 into the position B the slide *b* or the slide *c* or both will be stopped. When the operator wishes to cut a thread in the work-piece, he must move lever 16 into the outermost inclined position C. When the lever 15 during its turning movement from the position B towards the position C passes through the position C', the engagement of the nut with the lead spindle commences while the safety clutch remains in disengaged condition.

The block 21 has a transverse bore 29 for accommodation of a pivot pin 30 rotatably mounted therein and fixed to a hub 31 of the second hand lever 15. The hub 31 abuts the bottom of a recess provided in the side wall of the block 21. This hub 31 is provided with a projecting pin 32 which extends through a longitudinal slot 33 provided in block 21 forming part of the third shaft 14 and extends into a peripheral groove 34 provided in the second shaft 13 which is slidably mounted in the third shaft 14 and surrounds the first shaft 12. The inner end of the hollow shaft 13 projects out of the shaft 14 and its projecting end is provided with an annular outer groove 35 engaged by a fork member adapted to shift the reversing gear *g* to thereby control the advancing or returning motion of the cross slide *c*. When the hand lever 15 mounted for pivotal movement about the axis of the pivot pin 30 assumes the central position shown in FIG. 2, the reversing gearing *g* is in its neutral position in which it keeps the cross slide *c* at rest. When the lever 15 is swung towards the left with reference to FIG. 2, the reversing gearing *g* is so shifted as to prepare the reversing gearing *g* for advancing motion of the cross slide *c*. This motion, however, does not commence until the lever 16 will be shifted into its position A. By shifting lever 15 with reference to FIG. 2 towards the right the reversing gearing *g* will be conditioned for causing the cross slide *c* to return. This return motion too, however, will not occur until the lever 16 is moved into its position A.

The second lever 15, however, may be also turned about the axis of the shaft 12 into either one of the positions indicated in FIG. 3 by dashdotted lines at A and E. The shaft 14 is provided with a helical cam groove 36 engaged by a following member adapted to shift the reversing gearing *f* controlling the motions of the bed slide. When the lever 15 is in its central position shown in FIG. 3 by full lines in which the axis of lever 15 is within a vertical plane F the reversing gearing *f* is in its neutral position causing the bed slide *b* to remain at rest. When the operator turns the lever 15 towards the left into the position D, the reversing gearing *f* is shifted to a position in which it is prepared to advance the bed slide *b* towards the work-piece, i.e. towards the left with reference to FIG. 1. This motion, however, will not commence until the first lever 16 will be turned to its position A. When the operator turns lever 15 into the position E, however, the cam groove 36 of shaft 14 will shift the reversing gearing *f* into a position conditioning the bed slide *b* for returning movement towards the right.

The operator may turn the lever 15 simultaneously about both the axis of pivot pin 30 and the axis of shaft 12. Therefore, the lever 15 may be brought into nine different positions. In its vertical position both slides *b* and *c* will remain at rest irrespective of the actuation of lever 16. When the operator turns the lever 15 in the direction of the desired slide motion, it will prepare the revrsing gearing or gearings for such motion which will be initiated by subsequently shifting the lever 16 into its vertical position A.

As the lever 16 is positioned in front of the lever 15 it will protect the lever 15 from accidental actuation which otherwise might occur when the operator bending over the bed slide would touch the lever 15 with his body.

From the above description it will appear that the present invention efficiently achieves the objects above explained.

What I claim is:

1. In a lathe of the type provided with a bed slide, with a cross slide carried thereby, with a transmission box fixed to said bed slide, with first means in said box for advancing and returning said slide on said bed, with second means in said box for advancing and returning said cross slide on said bed slide, with a lead spindle mounted on said bed, with a device in said box for engaging a nut with and disengaging it from said lead spindle and with a clutch inserted within said means, a first hand lever on said transmission box for controlling said device and said clutch, a second hand lever for controlling said first means and said second means, mounting means for mounting said second hand lever for universal movement, a member connected to said second hand lever to be responsive to angular displacements thereof longitudinally of said bed slide and controlling the motions thereof, and another member connected to said second hand lever to be responsive to angular displacements thereof longitudinally of said cross slide and controlling the motions thereof, said first lever being mounted in front of said second lever to protect it from accidental displacement.

2. In a lathe of the type provided with a bed slide, with a cross slide carried thereby, with a transmission box fixed to said bed slide, with first means in said box for advancing and returning said slide on said bed, with second means in said box for advancing and returning said cross slide on said bed slide, with a lead spindle mounted on said bed, and with a device in said box for engaging a nut with and disengaging it from said lead spindle and with a clutch inserted within said means, the combination comprising a plurality of coaxially disposed shafts mounted in nested relationship, the innermost one of said shafts being rotatable, means cooperatively connected with said device and with said clutch and mounted to be responsive to rotation of said innermost shaft, a second one of said shafts being mounted for longitudinal displacement and being cooperatively connected with said second means, a third one of said shafts being rotatably and non-shiftably mounted and being connected with said first means, a first hand lever fixed to said innermost shaft to be rotatable therewith for controlling said nut engaging device and reengagement of said safety clutch, and a second lever mounted for universal movement and connected with said second one of said shafts for longitudinal displacement thereof and with said third one of said shafts for rotation thereof for controlling said advancing and returning motions of both of said slides individually or jointly.

3. In a lathe, a mechanism of the character described comprising a transmission box having a front wall, a shaft rotatably mounted in said box and projecting through said front wall, a first hand lever fixed to the projecting end of said first shaft, a second shaft being hollow and mounted on said first shaft for longitudinal displacement and being provided with a peripheral groove, a third shaft being hollow and mounted on said second shaft and provided with a longitudinal slot registering with said groove, said third shaft being journaled for rotation in said front wall and projecting therethrough, a second hand lever hinged to the projecting end of said third shaft for pivotal movement about an axis extending transversely of said third shaft, said hand lever being provided with a pin extending through said slot into said groove, control means responsive to rotation of said first shaft by said first hand lever, control means responsive to longitudinal displacement of said second shaft by said pin fixed to said second hand lever, and control means responsive to rotation of said third shaft by said second hand lever, said first lever being disposed in front of said second lever.

References Cited
UNITED STATES PATENTS

| | | | |
|---|---|---|---|
| 2,305,792 | 12/1942 | Mobius et al. | 82—22 |
| 2,423,904 | 7/1947 | Ruetschi | 82—22 |

LEONIDAS VLACHOS, *Primary Examiner.*

U.S. Cl. X.R.

82—23; 74—471